No. 834,335. PATENTED OCT. 30, 1906.
C. G. C. C. TAYLOR.
APPARATUS FOR COALING SHIPS FROM COLLIERS.
APPLICATION FILED JAN. 10, 1906.

4 SHEETS—SHEET 1.

No. 834,335. PATENTED OCT. 30, 1906.
C. G. C. C. TAYLOR.
APPARATUS FOR COALING SHIPS FROM COLLIERS.
APPLICATION FILED JAN. 10, 1906.
4 SHEETS—SHEET 2.
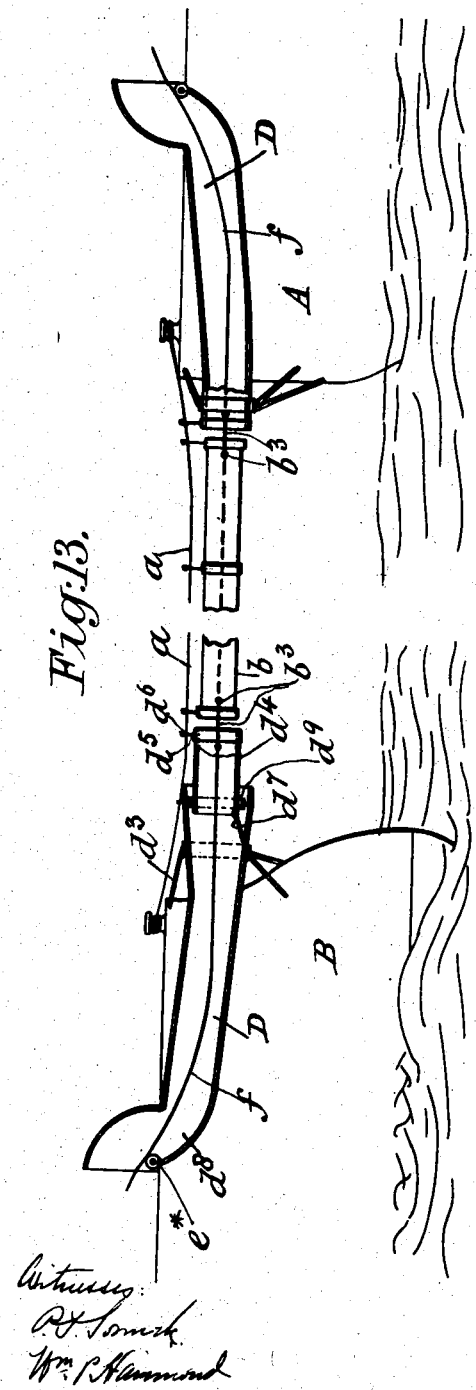
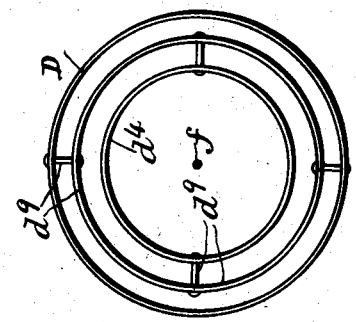
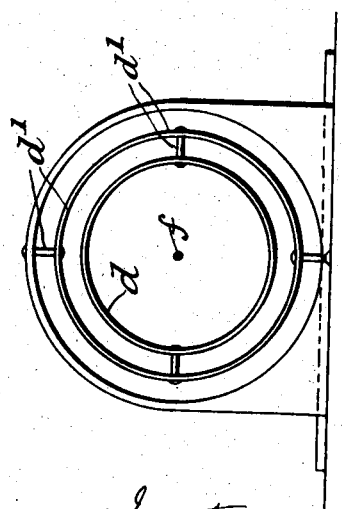

No. 834,335. PATENTED OCT. 30, 1906.
C. G. C. C. TAYLOR.
APPARATUS FOR COALING SHIPS FROM COLLIERS.
APPLICATION FILED JAN. 10, 1906.
4 SHEETS—SHEET 3.
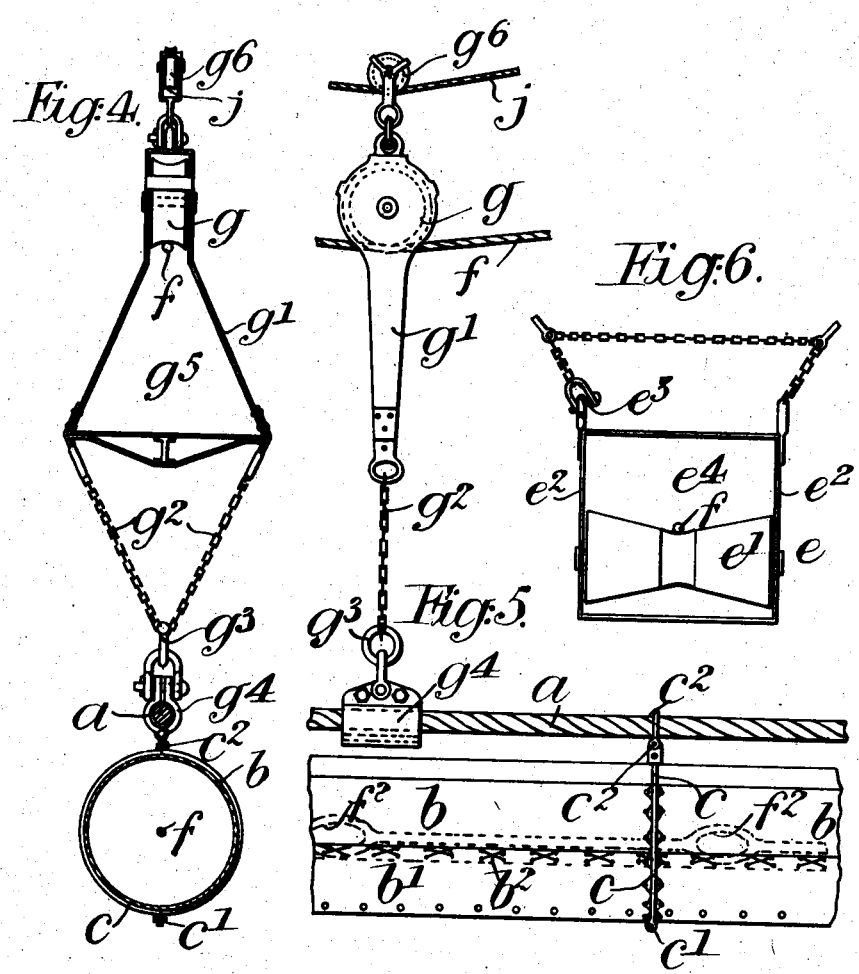

No. 834,335. PATENTED OCT. 30, 1906.
C. G. C. C. TAYLOR.
APPARATUS FOR COALING SHIPS FROM COLLIERS.
APPLICATION FILED JAN. 10, 1906.
4 SHEETS—SHEET 4.
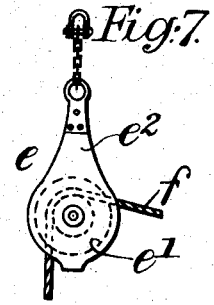
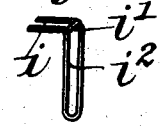
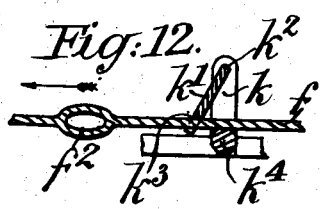

UNITED STATES PATENT OFFICE.

CHARLES G. C. C. TAYLOR, OF BASILDON, NEAR PITSEA, ENGLAND.

APPARATUS FOR COALING SHIPS FROM COLLIERS.

No. 834,335.　　　　Specification of Letters Patent.　　　Patented Oct. 30, 1906.

Application filed January 10, 1906. Serial No. 295,404.

To all whom it may concern:

Be it known that I, CHARLES GEORGE CARROLL CAVENDISH TAYLOR, a subject of the King of Great Britain, residing at Basildon, near Pitsea, in the county of Essex, England, have invented new and useful Means and Apparatus for Coaling Ships from Colliers, of which the following is a specification.

The object of the present invention is to provide means for coaling battle and other ships with rapidity, without waste, and at the same time without interfering with the speed of the ship or necessitating structural alterations to any material degree.

The apparatus by which the invention is carried into effect is simple and not likely to get out of order, it is not costly, and may be readily stowed away when not required for use.

The invention is illustrated in the accompanying drawings, in which—

Figure 1:
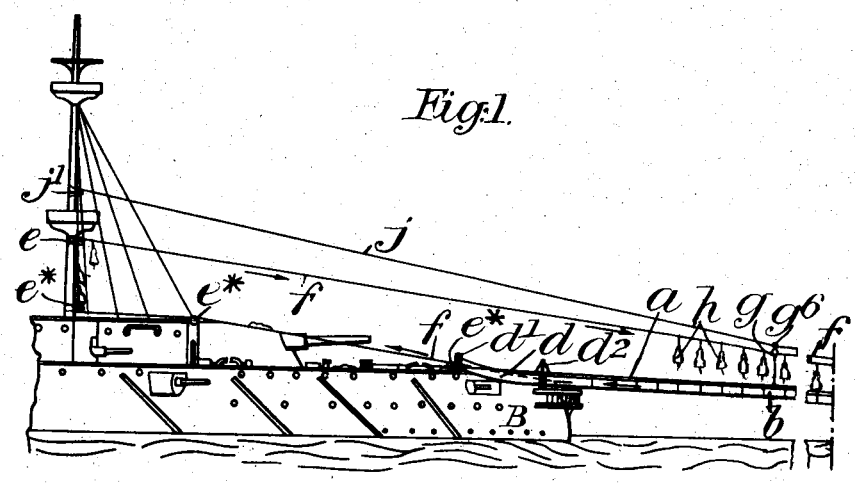
Figure 2:
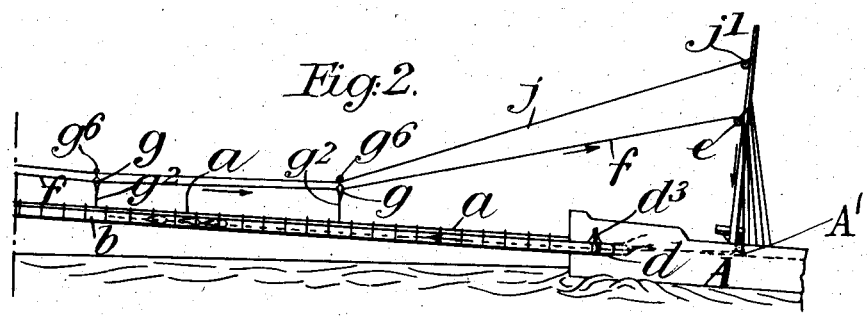
Figure 3:
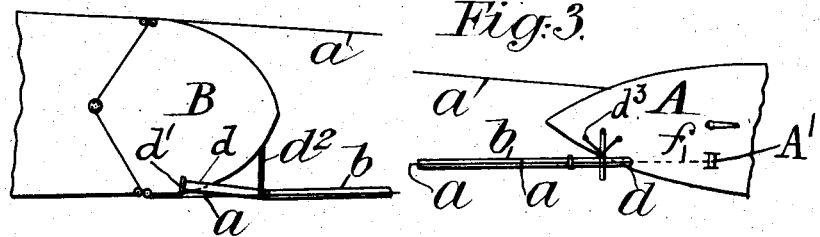

Figure 1 is a side elevation of the stern of a battle-ship, and Fig. 2 is a side elevation of the bow of a collier, both showing the coaling apparatus applied thereto. Fig. 1$^a$ is an end view of the gimbaled chute. Fig. 3 is a diagrammatic plan view of the parts of the battle-ship and collier, showing an arrangement of two towing-hawsers and coaling apparatus. Fig. 4 is a cross-section, to an enlarged scale, of the canvas coaling-tube and hawsers and showing an end elevation of one of the blocks supporting the said tube between the two vessels; and Fig. 5 is a side elevation of the same. Fig. 6 is an end elevation, and Fig. 7 is a side elevation, of one of the blocks for the coaling-hawser, which is attathed to the mast. Fig. 8 shows part of the coaling-hawser provided with a swivel-joint. Fig. 9 shows an empty sack, and Fig. 10 shows the same full of coal with the mouth tied up. Fig. 11 shows a suitable instrument which may be used for rapidly detaching the coal-sacks. Fig. 12 shows a pawl for preventing the coaling-hawser moving backward. Fig. 13 is a side elevation of parts of a battle-ship and collier, showing a modification of the method of carrying the invention into effect. Fig. 14 is a sectional view showing the gimbaled parts of Fig. 13.

In carrying the invention into effect, the collier A is connected to the battle or other ship B by one or two strong hawsers $a$ in any usual manner. I preferably employ two hawsers $a$, as shown at Fig. 3, to restrict yawing of the collier A. Depending from this towing-hawser $a$ is a flexible tube $b$, preferably made of canvas and suitably strengthened at the lower part. This tube $b$ may be made in two parts, as shown at Fig. 5, to enable the lower part $b'$ to be renewed when worn out. The lower part $b$ is preferably made of two thicknesses of canvas laced to the upper part $b$ on the line $b^2$. This flexible tube $b$ is made in suitable lengths and means are provided for connecting such lengths together. Such connecting means may consist of lacing-holes and laces $b^3$.

The tube $b$ is connected to the hawser $a$ by means of steel bands $c$, passing around the tube. Such bands $c$ are preferably made in two parts connected by bolts $c'$ and provided with shackles $c^2$, through which the hawser $a$ passes. (See Figs. 4 and 5.) At each end of this flexible tube $b$ is a chute $d$, the one being carried by the collier A and the other by the battle or other ship B, such chutes leading into and from the flexible tube $b$. Passing through such tube $b$ and chutes $d$ and over suitable guide-blocks $e$ is an endless coaling-hawser $f$, which is hauled by an engine preferably located on the collier. The hauling-drum A' is shown at Figs. 2 and 3. This endless coaling-hawser $f$ passes from the hauling-engine drum down the chute $d$ on the collier A, through the flexible tube $b$, up the chute $d$ on the battle or other ship B, then over rollers or guide-pulleys $e^*$ on this latter, after which it passes upward and over a suitably-constructed block $e$, secured between the mast and rigging, then down toward the towing-hawser $a$, along which it passes under suitable blocks $g$ attached to the towing-hawser $a$, whence it passes up to another suitably-constructed block $e$ between the mast and rigging of the collier A and down to the hauling-engine. This coaling-hawser $f$ is preferably made in suitable lengths connected by swiveling-joints $f$, some lengths being shorter than others to enable it to be tightened up when the apparatus is rigged up for use. The coaling-hawser $f$ is provided with rings or thimbles $f^2$ at equal distances throughout its length.

The coal-bags $h$ are preferably conical in form, the larger ends being provided with a short length of rope $h'$ or other means for closing the same, and the smaller ends having a ring $h^2$, swivel $h^3$, and spring-hook $h^4$, to enable them to be rapidly attached to and detached from the rings or thimbles $f^2$ on the endless coaling-hawser $f$. The spring-hook $h^4$ is preferably formed with two arms made of spring metal, each arm crossing over the other and terminating in a hook $h^5$, the two hooks overlapping and forming a ring $h^6$, when the spring-hook is at rest. When the two sides of such hook are caused to approach each other by gripping them with the hand, the two overlapping hooked portions $h^5$ open away from each other, as shown at Fig. 10, enabling the hook $h^4$ to be readily attached to and detached from the rings or thimbles $f^2$ on the coaling-hawser $f$.

A suitable instrument (shown at Fig. 11) in the shape of a two-armed fork, the arms $i$ of which are connected by a cross-piece $i'$, and the ends of the fork members or arms being bent at about right angles to the stem or handle $i^2$ may be employed to cause the two arms of the spring-hooks $h^4$ to approach each other when it is desired to detach a bag from the coaling-hawser $f$. The said suitably-constructed guide blocks or pulleys $e$ and $g$ between the battle or other ship B and the collier A must have sufficient clearance to enable the bags to pass back to the collier after they have been emptied and have been again attached to the coaling-hawser $f$. The block $e$, as shown at Figs. 6 and 7, consists of a roller $e'$, mounted in a frame $e^2$, provided with shackles $e^3$, by which it is connected by means of chains to the shroud or mast. It has sufficient clearance at $e^4$ between the roller $e'$ and the frame $e^2$ to enable the empty bags $h$ to pass back to the collier A.

The coaling-hawser being connected to the towing-hawser at several points intermediate of the two ships, by passing under said suitably-constructed blocks $g$, attached to the towing-hawser $a$, retains this latter and the flexible tube $b$ in a comparatively straight line without any sagging. Each block $g$ is preferably mounted at the upper part of a frame $g'$, connected by chains $g^2$ to a shackle $g^3$, to which are attached gripping-jaws $g^4$, passing around the towing-hawser $a$. The frame $g'$ has sufficient space at $g^5$ to enable the empty bags $h$, attached to the coaling-hawser $f$, to pass back to the collier A. In some cases, as shown in Figs. 1, 2, 4, and 5, the frame $g'$ is carried up and has a lift-block $g^6$ at its top under which passes a lift or rope $j$, which passes over blocks $j'$, attached to the masts of the collier A and ship B and gives support to the block $g$, and, through the frame $g'$ and chains $g^2$, to the towing-hawser $a$ and canvas tube $b$.

The chute $d$ on the battle or other ship B is preferably mounted in gimbals $d'$.

The flexible tube $b$ may in very fine weather be dispensed with.

Both chutes $d$ are suitably curved to pass down on one side of the towing-hawser $a$ into the flexible tube $b$. That on the battle or other ship B is steadied at its outer end by being attached to the towing-hawser $a$ or by means of a stay $d^2$, and that on the collier by a collar and iron stays $d^3$, attached to the bow. In the modified form of apparatus shown in Fig. 13, the chute D on the battleship is fixed below the deck and is prolonged rearward by the smaller metal chute $d^4$. The two chutes D and $d^4$ are connected together by gimbals, and the smaller chute is partly supported by a rope or chain $d^5$ and by a snatch-block $d^6$, bearing on the towing-hawser $a$. A hinged apron $d^7$ is preferably employed to prevent injury to the bags passing from one chute to the other. When employing fixed chutes, as shown in this figure, they are preferably formed straight throughout the greater part of their length and terminate with curved portions $d^8$, as shown.

I prefer to employ a pawl on the battle or other ship, as shown in Fig. 12, to prevent the coaling-hawser $f$ running backward, which otherwise might take place if the two ships were to approach each other, as the loaded sacks in the canvas tube $b$ would then have an opportunity of pulling the coaling-hawser $f$ backward. The pawl consists of strong posts or a frame $k$, having a plate $k'$ pivoted to the posts or frame at $k^2$. This plate $k'$ has a small opening or groove $k^3$ in its bottom sufficiently large to take the coaling-hawser $f$. When the coaling-hawser $f$ is moving forward in the direction of the arrow, the rings or thimbles $f^2$ raise the plate $k'$ and pass between the same and the roller $k^4$. If the coaling-hawser commences to move backward, the first ring or thimble $f^2$, coming in contact with the plate, will force it down into contact with the roller $k^4$, and thus act as a stop and prevent the coaling-hawser moving any farther backward, as the ring or thimble $f^2$ cannot pass through the groove $k^3$.

What I claim as my invention, and desire to secure by Patent, is—

1. In a coaling apparatus, the combination of two vessels, an endless coaling-hawser, chutes carried by said vessels through which said hawser passes, blocks carried by said vessels over which said hawser passes and means for hauling said hawser, substantially as described.

2. In a coaling apparatus, the combination of two vessels, an endless coaling-hawser, rings carried by said hawser, blocks to guide the hawser, means for hauling the hawser, a chute carried by each vessel, a towing-hawser, a flexible tube, and means carried by said towing-hawser for supporting said flexible tube.

3. In a coaling apparatus, the combination of two vessels, an endless coaling-hawser, rings carried by said hawser, chutes and blocks carried by said vessels through and over which the said hawser passes, a plurality of coaling-bags each provided with a spring-hook adapting said bags to be attached to said rings of the coaling-hawser, and means for hauling the hawser.

4. In a coaling apparatus, the combination of two vessels, an endless hawser, rings carried by said hawser, blocks carried by said vessels to guide said hawser, a towing-hawser, a flexible tube, bands passing around said tube and shackles connected to said bands, through which said towing-hawser passes.

5. In a coaling apparatus, the combination of two vessels, a towing-hawser connected thereto, a flexible tube, bands passing around said tube, shackles connected to said bands, blocks attached to said towing-hawser for supporting said flexible tube in proximity thereto, blocks mounted on said vessels, an endless hawser passing over said blocks and through said flexible tube, and rings carried by said endless hawser.

6. In a coaling apparatus, the combination of two vessels, an endless hawser, swiveling joints in said hawser, rings carried by said hawser, and blocks and guide-pulleys carried by said vessels to guide the movement of said hawser.

7. In a coaling apparatus, the combination of two vessels, a towing-hawser connecting said vessels, a flexible tube carried by said hawser, a chute on one of said vessels, a fixed chute on the other of said vessels, and a small chute and gimbals for connecting said fixed chute and said small chute, substantially as described.

8. In a coaling apparatus, the combination of two vessels, an endless coaling-hawser, rings carried by said hawser, blocks and pulleys carried by said vessels to guide said hawser, a pawl on one of said vessels under which the hawser passes and means located on the other of said vessels for hauling said hawser.

9. In a coaling apparatus, the combination of two vessels, an endless coaling-hawser, rings carried thereby, blocks and pulleys located on each of said vessels to guide the movement of said hawser, and a plurality of coaling-bags each of conical form and provided with means for closing the larger opened end and having a ring, swivel and spring-hook at the smaller end.

10. In a conveying apparatus, the combination of two supports located at a distance from each other, a cable connecting said supports, a flexible tube carried by said cable, a chute located on each of said supports and communicating with said flexible tube, blocks carried by said supports and an endless hawser passing over said blocks and through said flexible tube.

11. In a conveying apparatus, the combination of two supports located at a distance from each other, a cable connecting said supports, a flexible tube carried by said cable, a chute located on each of said supports and communicating with said flexible tube, blocks carried by said supports, an endless hawser passing over said blocks and through said flexible tube, rings carried by said hawser and means for securing the material to be conveyed to said rings.

12. In a conveying apprataus, the combination of two supports arranged at a distance from each other, a cable secured to each of said supports, a flexible tube carried by said cable, chutes located on each of said supports and communicating with said flexible tube, pulleys carried by each of said supports, an endless hawser passing over said pulleys and through said flexible tube, and means on one of said supports for hauling said hawser.

13. In a conveying apparatus, the combination of two supporting members arranged at a distance from each other, a cable connecting said supporting members, a flexible tube carried by said cable and communicating with each of said supporting members and an endless hawser passing from one of said supporting members to the other of said supporting members and through said flexible tube and means for operating said hawser.

14. In a conveying apparatus, the combination of two suitable supports arranged at a distance from each other, a cable connecting said supports, a flexible tube carried by said cable and communicating with each of said supports, an endless hawser passing over said blocks and through said flexible tube and provided with rings, means for operating said endless hawser and a plurality of conical bags adapted to be attached to said rings.

15. In a conveying apparatus, the combination of two supports, arranged at a distance from each other, a cable connecting said supports, a flexible tube carried by said cable and communicating with each of said supports, blocks carried by each of said supports, an endless hawser passing over said blocks and through said flexible tube, means for hauling said hawser, and means on one of said supports for preventing the backward movement of said hawser.

16. In a conveying apparatus, the combination of two supports located at a distance from each other, a cable connecting said supports, a flexible tube carried by said cable and communicating with each of said supports, pulleys located on said supports, an endless hawser passing over said pulleys and through said flexible tube, means located on one of said supports for operating said hawser, a plurality of conically-shaped bags and means for securing said bags to said endless hawser.

17. In a conveying apparatus, the combination of two supporting members located apart, a cable connecting said supporting members, chutes located on each of said supporting members, a flexible tube carried by said cable and communicating with said chutes, pulleys carried by said supporting members, an endless hawser passing over said pulleys and through said flexible tube, rings on said hawser, a plurality of conically-shaped bags, spring-operated means for attaching said bags to said rings and means for hauling said hawser.

In witness whereof I have hereunto set my hand in presence of two witnesses.

C. G. C. C. TAYLOR.

Witnesses:
H. D. JAMESON,
WM. GIRLING.